United States Patent [19]

Chung et al.

[11] Patent Number: 4,822,637

[45] Date of Patent: * Apr. 18, 1989

[54] FABRICATION OF MAGNETIC RECORDING MEDIUM WITH LUBRICANT

[75] Inventors: Fred Chi-Tat Chung, Palo Alto; Ross P. Clark, San Jose, both of Calif.

[73] Assignee: Memorex Corporation, Santa Clara, Calif.

[*] Notice: The portion of the term of this patent subsequent to Apr. 21, 2004 has been disclaimed.

[21] Appl. No.: 928,677

[22] Filed: Nov. 7, 1986

Related U.S. Application Data

[60] Continuation of Ser. No. 681,727, Dec. 14, 1984, abandoned, which is a division of Ser. No. 661,983, Oct. 17, 1984, Pat. No. 4,659,627.

[51] Int. Cl.$^4$ ............................................. G11B 5/71
[52] U.S. Cl. ..................................... 427/128; 252/62.54; 427/127; 428/447; 428/694; 428/695; 428/900
[58] Field of Search ........................................... 427/127

[56] References Cited

U.S. PATENT DOCUMENTS

| 3,490,946 | 1/1970 | Wolff | 428/900 |
| 3,523,086 | 8/1970 | Bisschops | 428/900 |
| 3,597,273 | 8/1971 | Ahashi | 428/425.9 |
| 3,837,912 | 9/1974 | Roden | 428/900 |
| 3,983,302 | 9/1976 | Zucker | 428/425 |
| 3,993,846 | 11/1976 | Higuchi | 428/447 |
| 4,007,313 | 2/1977 | Higuchi | 428/447 |
| 4,007,314 | 2/1977 | Higuchi | 428/694 |
| 4,131,717 | 12/1978 | Hirano | 428/447 |
| 4,409,300 | 10/1983 | Ohkawa | 428/694 |
| 4,416,947 | 11/1983 | Yoda | 428/694 |
| 4,416,948 | 11/1983 | Ohkawa | 428/694 |
| 4,431,702 | 2/1984 | Kawahara | 428/694 |
| 4,431,703 | 2/1984 | Somezawa | 428/900 |
| 4,456,661 | 6/1984 | Yamamoto | 428/694 |
| 4,469,750 | 9/1984 | Fujki | 428/694 |
| 4,469,751 | 9/1984 | Kobayashi | 428/694 |
| 4,659,627 | 4/1987 | Chung | 428/900 |
| 4,686,146 | 8/1987 | Karle | 428/900 |

FOREIGN PATENT DOCUMENTS

| 0124707 | 9/1979 | Japan | 428/695 |
| 0124708 | 9/1979 | Japan | 428/695 |

Primary Examiner—Ellis P. Robinson
Attorney, Agent, or Firm—Townsend & Townsend

[57] ABSTRACT

Fabrication of magnetic recording media having a coating containing harsh pigment like $CrO_2$ particles and adapted for frequent contact with a head, with good durability, abrasivity, etc., accommodated by using a lubricant system including a fluoro-silicone oil and a compatible fatty-acid-ester like butoxy ethyl stearate.

14 Claims, No Drawings

FABRICATION OF MAGNETIC RECORDING MEDIUM WITH LUBRICANT

This application is a continuation of patent application Ser. No. 681,727, filed Dec. 14, 1984, now abandoned, which is a division of Application Ser. No. 661,983 filed Oct. 17, 1984 now U.S. Pat. No. 4,659,627.

This invention relates to a magnetic recording composition adapted for coating on a non-magnetic tape base or the like, and more particularly to such including an improved lubricant system incorporated therein, especially for media using chromium dioxide magnetic powder.

BACKGROUND, FEATURE OF INVENTION

Workers in the art of making and using magnetic recording apparatus are well aware that the media therefor experiences tremendous wear problems. A magnetic recording tape slides across a magnetic recording head, guide members, etc., at relatively high speeds and is apt to undesirably abrade both itself and the head, with a foreshortened useful life for both.

A related problem is that of undesirably high friction between the tape surface and the head surface. To ameliorate abrasion, workers typically require that a tape coating exhibit a certain (maximum) coefficient of friction—this also reduces the reel-force necessary to pull the tape past the head. To reduce friction and enhance wear, workers have resorted to various expedients such as "lubricated" tape coatings.

Such lubricated coatings are particularly important for magnetic tape (or like flexible disks) of the type used in computer recording, or in conjunction with video or audio recording where the relative head-medium velocity is very high, producing aggravated abrasion and reduced life (durability) of both head and media. Thus, workers have resorted to various lubricant means for such tape coatings and like media (e.g., see the following U.S. Pat. Nos. 3,490,946, 3,492,235, 3,523,086, 4,431,702, 3,983,302, 3,837,912, and 3,597,273).

It is an object of this invention to address such problems and particularly to teach novel magnetic recording compositions including improved lubricant systems, especially for such media which use chromium dioxide magnetic powder.

It is a more particular object to do so using a fluorosilicone (FS) lubricant compound in combination with a "fatty acid ester" lubricant (FAE). More particularly, it has been found that such an "FS/FAE" lubricant provision of a novel "high density/high performance (e.g., 30,000 flux transitions per inch feasible) chromium dioxide computer tape" that uses, a magnetic coating with FS/FAE lubricants to good advantage. For instance, compared with a standard ferric oxide computer tape, such a novel tape coating can give much higher storage density yet remain less abrasive than many standard ferric oxide tapes and give more durability than most—something that will surprise workers!

A salient form of the new magnetic recording compositions is for magnetic $CrO_2$ coatings for high density-high performance computer tape. Such tapes have heretofore exhibited unsatisfactory durability and abrasivity, etc.—such as to be commercially unattractive. For instance, their durability and abrasivity are unsatisfactory—problems which an FS/FAE lube system of the invention addresses.

The "fluorosilicone/FAE-lube" coatings of the invention are characterized by a fluorosilicone oil component in combination with a compatible stearate or like fatty acid ester component.

Now workers have, of course, incorporated lubricant components into a magnetic recording layer (with the pigment, binder, etc.). For instance, lubricants such as molybdenum disulfide, graphite or a wax have been suggested for use with a magnetic powder like gamma $Fe_2O_3$ and a binder like polyvinyl chloride. But such lubricants are not effective in giving the kind of superior durability (and low abrasivity) we desire; also, in heavy concentrations they can impair magnetic performance (e.g., see U.S. Pat. No. 4,431,703).

And workers are familiar with suggestions for using such lubricating agents as parafinnic hydrocarbons, fatty acids or esters or silicone oils (e.g., dimethyl- or diphenyl-silicone oil)—yet those don't give adequate durability or lubricity to the media, and can cause "bleeding" or "blooming" when used in large concentrations.

Some workers have suggested certain organo-polysiloxane/-polysilicone compounds as lubricants for magnetic recording media (e.g., see U.S. Pat. No. 3,993,846, or U.S. Pat. No. 4,007,314, or U.S. Pat. No. 4,131,717—or U.S. Pat. No. 4,007,313 mentioning an organo-silicone-fluoride lubricant; U.S. Pat. No. 4,431,703 suggests a like lubricant with various magnetic materials such as $CrO_2$).

GENERAL ASPECTS OF EMBODIMENTS

Certain salient features of our developments will come to mind upon review of this specification.

For instance, we prefer to formulate our lubricant system to comprise a liquid fluorosilicone plus compatible FAE component(s). The FAE component(s) will preferably comprise one or several compatible aliphatic (saturated or unsaturated) type fatty acid esters such as butoxy ethyl stearate. These are especially adapted for in-contact media using harsh pigment like chromium dioxide magnetic particles—they will be employed in concentrations apt for improved commercially-superior media (with good durability and reduced abrasivity). "In-contact" media are characterized by continual, or periodic frequent contact of a head therewith—as distinguished from media which seldom or never are so contacted.

Such tape coating formulations will be recognized by workers as useful with virtually any cooperating binder system—such as those characterized by various polyesters or poly ethers (especially urethane), epoxy or phenoxy, various "vinyls" (e.g., vinyl chloride, vinyl acetate copolymer, vinylidene chloride-acrylonitrile copolymer, polyvinyl butyral or the like), acrylics or acrylonitrile butadiene copolymer, nitrocellulose, etc.; or various mixtures thereof suitable for magnetic recording (tape) formulations, as artisans will recognize, along with other compatible ingredients of the usual kind.

Such lube systems will be recognized as suitable for magnetic tape record compositions, being particularly apt for use with "harsh", highly abrasive, powders (pigment) like chromium oxide.

At the indicated concentrations, one should expect the fatty acid ester (FAE) constituent(s) to function as a lubricant-plasticizer and as a "migratory" lubricant (to some extent); while the FS (fluorosilicone) oil will act as a "migratory" lubricant. The fluorosilicone oil should be used preferably in the low-to-moderate molecular weight form, since high molecular weight forms are "solid" at useful temperatures, and appear to be impractical (e.g., likely to cause coating application difficulties).

This fluorosilicone oil is added as a liquid compound; and is formulated to be compatible with the binder-solvent used, while being incompatible with the binder per se (at least sufficient to perform its migrant lubricating function, as understood by workers in the art).

PRIOR ART

Following are some instances, A, B and C, of relatively more conventional magnetic recording computer tape formulations, including more conventional lubricant systems, loaded however with $CrO_2$ magnetic powder (assume 68–82%). These should be considered by way of background, and preface, to discussion of the novel lubricant systems of the invention.

| Instance A: $CrO_2$ | | | |
|---|---|---|---|
| a | $CrO_2$ magnetic powder | | |
| b | Soya lecithin | | |
| c | Carbon | | |
| d | Binder | polyurethane polymer plus phenoxy cross linker (isocyanate type) catalyst | |
| | | | wt. % (of solids) |
| e | Lubricant System | Myristic Acid (role: NML) | 0.1–1.0 |
| | | Lauric Acid (NML) | 0.1–1.0 |
| | | Butyl Stearate (P/ML) | 0.5–3.0 |
| [f | Solvent: | 60–70 wt. % of total mixture] | 0.7–5.0 |

P: plasticizer
ML: lubricant
NML: non-migrating lubricant

| | | wt. % (of solids) |
|---|---|---|
| Instance B: as Inst. A, but with Modified Lubricant | | |
| e' | Lubricant | Zinc Stearate (NML) | 0.2–1.0 |
| | | "Armid HT" (Stearamide) (ML) | 0.05–1.0 |
| | | Butyl Stearate (P/ML) | 0.9–3.0 |
| | | | 1.15–5.0 |
| Instance C: as Inst. A, but with other Modified Lubricant | | |
| e'' | Lubricant System | Silicone oil (ML) | 0.05–2.0 |
| | | ("MolyKote 4-3600") | |
| | | Butoxyethyl stearate (P/ML) | 0.1–4.0 |
| | | | 0.15–6.0 |

Workers know that lubrication systems for such "high performance" magnetic recording compositions have been known to utilize a "compatible" or "fixed" constituent (being compatible with the binder system and acting as a lubricant and plasticizer, being incorporated into the recording composition); as well as a "non-compatible", or migratory, lubricant-constituent, one intended to migrate to the coating (tape) surface to function as a lubricant there, (e.g., according to a well-known "ablative" process).

Workers will appreciate that Inst. A has relatively little migrating component—and thus will exhibit high abrasivity and poor durability (short "life"). The two NML components are optional; a single one may be substituted.

In the foregoing Instances A, B and C, lubricant is preferably incorporated into the magnetic coating composition prior to applying the coating to its (non-magnetic) substrate such as a tape base of mylar, or the like. Of course, as workers know, lubricants have been applied in other ways; for example, as a protective super-film atop a magnetic coating.

Of course, such magnetic coating compositions are here assumed to include $CrO_2$ as the particulate magnetic material (suspended in the binder formulation). It will be understood that any of the known binder materials generally employed in the production of recording media (contact recording) can be used and in conventional proportions as aforesaid.

A measure of how efficient a lubricant is (e.g., in a computer tape or disk application) is "media-durability". For instance, with computer tape, one measures media wear (durability) using a "six-inch media shuttle test" (cf. GSA interim Federal specification #W-T-0051C). "Durability" improves, of course, as the tape passes more shuttle cycles. We so tested various lubricants for durability (incorporating many in a "test magnetic tape coating formulation" having 60 to 90% polyurethane and 10–40% phenoxy, plus wetting agents and crosslinking agents in minor concentrations. Lubricant materials tested included: butyl stearate, zinc stearate, stearamide (ARMID HT), and silicones (among others). Test results are given below.

Tape recording formulations which include harsh powders like $CrO_2$ present certain nasty problems to conventional lubricants as below-mentioned.

Special problems with $CrO_2$ powders

Generally speaking, workers can increase storage density by using magnetic particles having higher coercive force, like $CrO_2$ (chromium dioxide). For higher density, the width of the head-gap is typically reduced and R/W frequency increased; hence the R/W signal penetrates far less (into a tape coating). Thus, the "active" recording area becomes a very thin layer on the tape surface. Hence, tape coatings for $CrO_2$ will be thinner, the coating thickness depending largely on head design.

Such $CrO_2$ tapes were made, using a conventional binder system (cf. principally "Estane" as urethane and PKHJ Phenoxy polymers), along with a novel FS/FAE lubricant system according to this invention (including a fluoro-silicone oil and a "fatty acid ester". Lubricant concentration levels were devised to give superior tape durability and low abrasion characteristics.

Characteristics of Chromium Dioxide

Unlike ferric oxide compounds, chromium dioxide does not exist in nature and must be synthesized. Chromium dioxide particles are acicular (slender and neelde-like), with unusually uniform physical properties. (cf. $CrO_2$ crystals are 0.6 to 0.8 micrometers long with an aspect ratio of 10–15 to one; they have a precise shape, almost free of dendritic appendages. The crystals are also quite dense and nonporous.)

For a perspective on how well such small, precisely-shaped magnetic particles can function in recording media, consider the following: A linear-recorded bit density of 10,000 bits per inch means that each recorded flux transition will occupy 100 micro-inches along the recorded track. $CrO_2$ crystals are about 20 to 30 micro-inches long; and therefore, only about 3.3 to 5 $CrO_2$ crystal lengths can be fit into such a (100 micro-inch) recorded bit length.

$CrO_2$ crystals are so uniform and so small that they yield a relatively high "energy product" (measure of ability to retain magnetic flux in the presence of demagnetizing fields)—e.g., higher than ferrous or "cobalt-modified iron oxide" materials. $CrO_2$ particles appear to provide a narrower distribution of switching field energy than do other particles—that is, they include relatively fewer particles that will "not switch" under normal fields.

Because $CrO_2$ particles are "nondendritic" (i.e., exhibit no branching appendages or arms), they can be packed together more tightly (e.g, vs ferrous), with few voids. Thus, media using chromium dioxide allow thinner coatings (to maintain a given flux)—this giving increased pulse definition for a given output signal strength.

Durability problems (e.g., head wear) with such "harsh" ($CrO_2$) oxide media derive from such factors as: the very small particle size and resulting high surface area and the higher-than-normal "loading" [78 weight percent, vs about 69 weight percent for standard iron oxide computer tapes]—this decreasing the available [percentage of] binder material and so compromising coating strength. This makes $CrO_2$ tapes so abrasive as to be unsatisfactory in many commercial contexts.

Now, one special feature of our novel lubricant system is that the liquid fluoro-silicone migratory component provides especially good "interfacial lubrication" [between head and tape surfaces] and so ameliorates the need for high coating strength while tolerating reduced binder percentage.

Workers will recognize that our novel lubricant systems also reduce the characteristic abrasivity of $CrO_2$ tapes, making them more commercially feasible for high density digital recording.

Superior results

Workers will not be surprised that such $CrO_2$-loading in conventional tape coatings makes the tape so harsh and abrasive as to be brief-lived and impractical for the contemplated digital recording (e.g., vs typical video recording tape which actually uses tape-abrasion to "clean" the R/W head). For instance, with conventional lubricant systems like those in Inst. A, B or C, the $CrO_2$ tape will wear-out the heads after a mere 70 hours or so of use (computer applications). Yet, substituting an FS/FAE lubricant system according to the invention can extend head life to the order of 500 hours or more.

The present invention provides a solution to such problems whereby harsh abrasive ($CrO_2$) high density digital recording tapes mauy be made practical commercially [reasonably low abrasivity, high durability-life] by the mere inclusion of our novel FS/FAE lubricant system including fluoro-silicone and "fatty acid ester"components—as the following Examples show in some detail.

The invention will be better appreciated by workers upon consideration of the following detailed description of some preferred embodiments.

DESCRIPTION OF PREFERRED EMBODIMENTS

General description, background

Example I illustrates a magnetic (tape) recording composition formulated according to principles of this invention. This, and other means discussed herein, will generally be understood as selected, formulated, and operating as presently known in the art, except where otherwise specified. And, except as otherwise specified, all materials, methods, and devices and apparatus herein will be understood as implemented by known expedients according to present good practice.

A relatively conventional computer tape coating is prepared according to the invention being modified to include $CrO_2$ magnetic powder and a novel lubricant system especially formulated to accommodate $CrO_2$. This lubricating system comprises a liquid fluoro-silicone oil and a "fatty acid ester" such as butoxy ethyl stearate. This FS/FAE lubricant system will be seen to improve tape durability and reduce abrasivity, in a surprising fashion, accommodating the "harsh" $CrO_2$ pigment. This lubricant system is especially adapted to accommodate chromium dioxide magnetic powder, and thus facilitate high-density digital recording (e.g., order of 30,000 ftpi).

Following is a specific Example of such a tape composition embodiment used in the practice of the present invention. This composition is prepared to include the following components in the indicated concentrations.

Example I

| Role | | Component | wt. % Coating Mix | Pref. wt. % Coating Solids | Broad wt. % (Range) | Pref. wt. % Range (Solids) |
|---|---|---|---|---|---|---|
| | (a) | Magnetic Oxide ($CrO_2$) | 26.12 | 78.77 | 68–82 | 74–80 |
| dispersant | (b) | Soya Lecithin | 0.51 | 1.54 | 0.5–6.0 | 2–3 |
| conduc. agt. | (c) | Carbon XC-72R | 0.33 | 1.00 | 0.5–7.0 | 1–4 |
| binder | (d) | Estane 5701 F1 | 4.00 | 12.06 | 4.0–20.0 | 10–16 |
| (cross-link) | (e) | Phenoxy PKHJ | 1.33 | 4.01 | 1.0–10.0 | |
| (catalyst) | (f) | Polyisocyanatemondur CB-60 | 0.16 | 0.48 | 0.1–4.0 | .5–2 |
| | (g) | FeAA** | 0.01 | 0.03 | 0.001–1.0 | .05–.2 |
| lube sys. | (h) | Butoxyethyl Stearate | 0.62 | 1.87 | 0.2–10.0 | 1–7* |
| | (i) | Fluoro-silicone FS-1265 | 0.08 | 0.3–.4 | 0.1–10.0 | .4–3 |
| solvent | (j) | Cyclohexanone | 66.84 | | | |

*e.g., 3x–12x FS oil
**optional, to accel. cure

| Function and Purpose of Ingredients: | |
|---|---|
| Ingredients | Function and Purpose |
| (a) Magnetic Oxide | chromium dioxide is the ("harsh") magnetic powder |

| Ingredients | Function and Purpose |
|---|---|
| | used here to yield high output signal performance at high recording densities (e.g., 10–30K FTPI). DuPont's magnetic chromium dioxide powder is a suitable $CrO_2$. This formulation is optimized for an oxide loading level of about 79% by weight. |
| (b) Soya Lecithin | A liquid soya lecithin is preferred (e.g., 3FUB by Central Soya or GAFAC RE-610, complex phosphate esters of non-ionic surfactants of the ethylene oxide-adduct type by GAF — also see U.S. Pat. No. 4,420,537). This dispersant is used to assist in thoroughly wetting-out and dispersing the pigment agglomerates ($CrO_2$, Carbon). Ideally, each acicular ($CrO_2$) particle will be separated from its neighbor in the binder matrix. Other like (natural or synthetic) dispersants will occur to workers. |
| (c) Conductive Carbon | "Vulcan Carbon Black XC-72R" for conductivity control (by Cabot Corp.) is used or a like conductive carbon powder. Chromium dioxide, in itself, is more conductive than conventional gamma ferric oxides and cobalt modified iron oxides. To give a more representative finished tape resistivity (0–1000 $M^2$/square), a minimum of 0.5% conductive carbon should be incorporated. This should also stabilize resistance, resulting in a manufacturable uniform product. Tape conductivity must be regulated to avoid build-up of static charge which can interfere with proper transport of the tape and cause loose debris to collect on the tape, leading to loss of data ("dropouts") and general untidiness. |
| (d) Estane 5701F1 | is a representative (polyesterurethane) binder polymer; with phenoxy, here it forms the binder bulk. (Estane 5701F1 is a preferred polyesterurethane because of its high abrasion resistance and selected solvent compatibility.) In many instances, another polyurethane ester may be substituted that yields a compatible mixture and is solvent-system-compatible; and that will cause the FS oil to migrate. Other binder materials useful with such $CrO_2$ (computer tape) formulations will be |

| Ingredients | Function and Purpose |
|---|---|
| | evident; [polyurethane and vinyl types are preferred]. |
| (e) Phenoxy PKHJ/PKHH | (by Union Carbide are representative (phenoxy polymer) binder co-constituents with the polyester urethane (Estane 5701F1) and cross-linker (below). Estane 5701F1 and either, or both, phenoxy (PKHH or PKHJ) combine nicely to form a binder system which provides excellent adhesion and cohesion (for the $CrO_2$ and carbon on the basefilm); and which will also contribute to good durability, low abrasivity, and low "wiper debris" and "clog". Due to the high oxide ($CrO_2$) loading level required here for the desired output performance, the Estane-PKHJ/PKHH ratios are best blended at 75/25 ratio (range: 50/50–90/10) to give good adhesion and cohesion. Test results indicate excellent "6-inch shuttle durability" (350K cycles), excellent "clog" (0 index) and low "wiper debris" (1.0 or less). |
| (f) Polyisocyanate Mondur CB-60 | by Mobay Co., a polyisocyanate polymer is a good binder/cross-linker for the phenoxy-in-polyurethane, and a curing agent; i.e., the isocyanates to react with the hydroxyl groups in the phenoxy polymer (the Estane is pre-cured) to form a thermosetting system which provides exceptional flexibility and adhesion/cohesion under extreme environmental conditions. Other like cross-linkers will be evident to workers [e.g., Mondur CB-75 by Mobay; Spenkel P-49-60CX by Spencer Kellog; PAPPI by UpJohn; ferric acetyl acetonate]. |
| (g) Catalyst | (FeAA) by Mackenzie Co. is a very effective catalyst for the isocyanate/hydroxyl reaction of the binder system. Workers will contemplate others such as acetyl acetonate Metal Complex by Mackenzie. |
| (h) Novel FS/FAE Lube System | A liquid FS (like "FS-1265", below) is combined with a suitable FAE (e.g., see butoxyethyl stearate, Ex. I). The butoxy ethyl stearate is a non-migrating lubricant with some migrating qualities; it also has a plasticizer effect, i.e., the stearate molecules are evenly distributed throughout the pigment/polymer matrix and thus provide constant lubrication throughout the life cycle of the tape. Here, an FAE concentration of |

| Ingredients | Function and Purpose |
|---|---|
| | 1–7 wt. % of solids is preferred to give desirable surface quality (cf. when combined with FS oil, a very desirable durability and abrasion performance is realized). The butoxy ethyl stearate may be substituted-for, in many cases, by any compatible "fatty acid ester" as defined below. "Fatty Acid Esters": Fatty acid esters suitable with the instant invention are those compatible with the rest of the constituents and derived from a monobasic aliphatic acid of 12 to 20 carbon atoms and a mono-valent alcohol having 3 to 12 carbon atoms. Structure (I) below represents a typical generic formula. Structure (I): RCOOR' where: R = alkyl, alkenyl R' = alkyl, aryl, alkenyl, cycloalkyl, etc. Illustrative of some preferred fatty acid esters are: butyl myristate, butyl palmitate, propyl stearate, butyl stearate, butoxy ethyl stearate (the latter two the most preferred). Eliminating the fatty acid ester entirely seems to badly weaken durability (e.g., drops from an optimum 100K+ to about 1K Max. — see below also). |
| (i) Fluorosilicone Oil (FS-1265 by Dow Corning, pref.) | FS-1265 or a like liquid fluorosilicone (FS oil) is found to combine surprisingly well with FAE for $CrO_2$ coatings. It has a migrating effect, providing constant lubrication specifically to minimize friction on the tape surface, yielding very low abrasion there (head-tape contact) and excellent durability (wear resistance). Lubricant System: The subject FS/FAE lubricant system in this formulation will be seen to enhance tape durability and reduce its abrasivity, as well as reducing "clog" and "wiper debris". This lubricant system will be noted as comprising a mixture of "fatty acid ester" and a suitable fluorosilicone oil; Fluorosilicone FS-1265 (Dow Corning Chemical) being preferred. FS-1265 is an oil that was heretofore specified merely for gross lubrication uses (e.g., as a base for pump grease or bearing lube oils, etc.) It was also thought feasible to help smooth a coating's finish; but it was quite unexpected to find that it could be used to ameliorate the durability and abrasivity problems of such a $CrO_2$ computer tape composition without adverse side effects, and especially in such concentrations. This will not only surprise workers but will prove very practical, because such FS oil is widely available and low in cost (e.g., less expensive than pure fluorocarbon). The lower concentrations of FS-1265 (e.g., about 0.1–.2 wt. % solids) gave very fine durability (e.g., 100K+ cycles — stearate at 1.0% here); but was somewhat too abrasive (abras. index of 123–144). But doubling the stearate and FS-1265 concentrations (e.g., to about 2 wt. % and .3–.4 wt. % resp.) kept this excellent durability (100K+ cycles) while greatly improving abrasivity (reduced index to 4–40 level). Fluorosilicone Oil Particulars: A low-to-moderate molecular weight FS oil is preferred (e.g., 2K–10K) to assure acceptable coating properties (e.g., excessive molecular weight, high viscosities can yield solvent incompatibility and poor coating surface quality. A viscosity range of 300–10K CTSK is preferred). Concentration is important also: too little % FS will result in unacceptably-high "abrasivity" (see above) and will compromise durability; while too much is likely to lead to unacceptably-high "clog". Thus, we prefer from about 0.3–0.4 up to about 3 wt. % of solids. Of course, the fluorosilicone oil should be very compatible with the binder solvent (e.g., soluble in cyclohexanone, here), while being relatively incompatible with the Binder bulk, and thus forced to "migrate" and lubricate the tape surface during operating life. The ratio of fatty acid ester to fluorosilicone oil determines end product performance; here we usually prefer from about 3/1 to 12/1. Workers will contemplate other analogous fluorosilicone oils that are suitable, in certain instances, for replacing |

| Ingredients | Function and Purpose |
|---|---|
| | the FS-1265.<br>Examples are:<br>(1) Polymethyl - 3,3,3, -<br>trifluoropropyl<br>siloxane - Three<br>viscosity ranges<br>available: 300, 1,000,<br>10,000 ctsk, from<br>Petrarch Systems, Inc.<br>(10,000 ctsk visc.<br>levels believed<br>optimum).<br>(2) Polymethyl 1,1,2,2 -<br>tetrahydro-<br>perfluorooctyl siloxane,<br>100–500 ctsk, by<br>Petrarch Systems, Inc. |
| (j) Cyclohexanone | The organic solvent<br>(dissolving medium) for the<br>polymers also controls the<br>viscosity for dispersion and<br>coating purposes. Other<br>compatible solvents will be<br>evident to workers (e.g.,<br>MEK, tetrahydrofuran). |

FORMULATION METHODS

The composition of Ex. I is prepared by procedures well known in the art. The formulation premix is milled and dispersed in enough solvent to give a final solid composition with 30 to 40% non-volatiles. Milling is continued until a stable high quality dispersion is obtained.

The final formulation is applied as a thin (e.g., 0.0002") film on computer tape (cf. PET, polyethylene terephthalate web about 0.0014" thick). The so-coated tape is subjected to particle orientation, curing, drying, and surface-treatment as known in the art. A 1.35 mil basefilm is preferred for a high performance tape product; however, a 0.92 mil or thinner basefilm can also be used. Basefilm requirements will depend upon final product packaging and length/data storage requirements.

RESULTS

The desired high performance $CrO_2$ computer tape is produced. It is capable of very high density recording [9,000–30,000 FTP1; cf. 6250 bpi] with associated high output (e.g., by comparison, commercial-grade ferric oxide tape has a maximum data storage capability at approx. 12,000 FTP1).

Other magnetic properties will be superior or better (e.g., squareness 0.947).

Other tape characteristics are acceptable or better, while "Durability" is outstanding and Abrasivity is quite low (without use of alumina or like "durability-enhancers"). More particularly, some exemplary test results indicate:

- a Durability as high as 300K cycles
- an Abrasivity index (Fullmer method) as low as 4-30, presaging much less head-wear (less even than many current ferric oxide tapes).
- a "clog" factor that is excellent ("zero")*
- a "wiper debris" rating as low as 0.1–0.6**

Oxide Loading level (cf. 79% in Ex. I): Please note:
**Memorex Wiper Debris Test: Entire length of tape is passed through normal wipe once; wipe tested for "magnetic debris" (lost oxide) with a "B/H Meter" (0–0.9 is "acceptable").

*Memorex Clog Test: A "clog" is a transfer of sufficient debris from tape to head assembly to cause 10+% reduction in read signal amplitude for 50 ft. tape length. A "clog index" is:

$$\text{no. of clog events} \times \frac{10 \text{ passes}}{\text{actual passes}} \times \frac{8 \text{ tracks}}{\text{act. tracks}} \times 10$$

Formulations with such oxide loading levels (76–79 wt.% or higher; cf. the pigment-to-binder ratio in the final tape formulation of 4.82/1 is considered extremely high for magnetic tape, vs a "normal" 3.63/1) can achieve high outputs at 25K ftpi (more than 180%). Durability is excellent for such high oxide loading levels, as was "wiper debris".

Considering the overall performance, such a $CrO_2$ formulation will be preferred by artisans for high performance computer tape.

The foregoing results are outstanding for a $CrO_2$ computer tape—the results compare very favorably with what conventional Binder-Lube systems offer (those having no $CrO_2$)—as noted below.

Results vs Instances A, B, C

When a comparable $CrO_2$-loading of some "conventional" Binder-Lube systems (cf. Instances A, B and C above) is undertaken, the results demonstrate that the invention (e.g., according to Example I above) is markedly superior in Durability and (low) Abrasivity, as is summarized below in Table I.

TABLE I

| Instance | 6-inch*<br>Shuttle<br>Durability<br>(K Cycles) | Abrasivity**<br>Index |
|---|---|---|
| A | <10 | >150 |
| B | <20 | >150 |
| C | <30 | >100 |
| Ex. I (inv.) | >300 (best) | <40 (best) |

Note:
***Higher is better
****Lower is better

SUMMARY COMPARISON WITH OTHER LUBE SYSTEMS

Case a: Lube: only FAE—inferior

If a lube system for a $CrO_2$ computer tape formulation like Ex. I consisted only of (one or several) "fatty acid esters" (as above defined), the results would be unacceptable. The harsh $CrO_2$ powder would give a tape which wears out much too quickly.

Case b: Lube: FAE plus: silicone oil—inferior

If Case a is modified so the lube system also includes a silicone oil [e.g., MolyKote 4-3600 as in Inst. C], durability would likewise be unacceptable (e.g., about 2K cycles—vs about 300K+ with invention).

Case b': Lube: FAE plus other silicone oil—inferior

For test purposes, the composition of Ex. I is replicated except that the fluoro-silicone oil is replaced by a mere silicone oil (e.g., 0.12% polysiloxane oil with 1.0% butoxy ethyl stearate). Result is low durability and high abrasivity values.

For instance, our test have shown very poor Durability (13K cycles vs 100–300K with Ex. I, using FS-1265); while Abrasivity was not too favorable either (about #100 vs about 20–65 with Example I). This very inferior durability was quite surprising.

Case c: Lube: silicone oil alone—inferior

If the only lube constituent is a silicone oil, durability will be very poor (e.g., Molykote 4-3600 silicone oil by Dow Corning will give about 10K or less).

Case d: Lube: only a fluoro carbon

If the only lube constituent is a fluorosilicone oil (FS-1265 or the like; no fatty acid ester), one will realize a very low durability (about 1K cycles) and poor abrasion values.

If the only lube constituent is a fluorocarbon like Teflon, inferior durability will still result.

Case e: Lube: FAE plus low % FS oil

If the lube of Example I is used, but the wt.% fluoro-silicone oil is reduced (e.g., to <0.1% wt.% as some workers have known for merely enhancing coating smoothness, etc., and without regard to durability or abrasivity (and without reference to high loading with harsh powders like $CrO_2$), the result will be low durability and high abrasion.

CONCLUSIONS i. When chromium dioxide is used with a state-of-the-art lubricant system (e.g., as Inst. A, B or C), media wear increases, and durability decreases.

But incorporating a FS/FAE lube according to the invention can increase durability enormously.

ii. Abrasivity tests (either the "Fullmer" abrasivity method or the Memorex in-house-developed "Radicon" test) denote head wear as a function of the abrasivity of the magnetic computer tape. When chromium dioxide is used with the state-of-the-art lubrication system, abrasivity increases markedly. The FS-FAE lube system of the invention can meet this problem also, reducing abrasivity.

iii. The FS/FAE lube also alleviates "clog" and reduces "wear debris".

FS/FAE affords these advantages even for tapes which are heavily-loaded with $CrO_2$—and, rather surprisingly, does so without any trade-off degradation of other properties (e.g., magnetic properties are very excellent).

iv. Various related stearates, by themselves, give radically inferior results (cf. case a).

And supplementing the stearates with other conventional like materials doesn't seem to help much (Inst. A, B), even when one adds a silicone oil (Inst. C, case b); even when one adds FS oil, results are inferior unless enough wt.% is used.

v. Thus, there seems to be little doubt that one needs FAE and the proper % of FS oil to achieve the results indicated here (e.g., good Durability, Abrasivity for $CrO_2$ in-contact media)—whereas either component by itself is relatively ineffective. This is a synergism that will probably surprise workers.

It will be understood that the preferred embodiments described herein are only exemplary, and that the invention is capable of many modifications and variations in construction, arrangement, and use without departing from the spirit of the invention.

Further modifications of the invention are also possible. For example, the means and methods disclosed herein are also applicable for other like (in-contact, computer) tape and flexible media (e.g., floppy disks). Also, the present invention is applicable for providing a lubricant system in other analogous situations (such as for rigid, non-contact media).

The above examples of possible variations of the present invention are merely illustrative. Accordingly, the present invention is to be considered as including all possible modifications and variations coming within the scope of the invention as defined by the appended claims.

What is claimed is:

1. A method of providing a coating for magnetic records, this method including preparing a binder to include a lubricant system comprising a fluoro-silicone oil and a fatty acid ester combined therewith; wherein the ratio of fatty acid ester to fluoro-silicone oil is from about 3/1 to about 12/1;

the fluoro-silicone oil constitutes from three-tenths to ten wt.% of the dry coating solids;

the fluoro-silicone-ester system having a viscosity, concentration, and molecular weight selected to enhance migration of the lubricant; and dispersing one or more abrasive pigment constituents in the binder.

2. The method as recited in claim 1 wherein the pigment is selected to comprise a $CrO_2$ type magnetic recording pigment.

3. The method as recited in claim 1 wherein the lubricant system is arranged to comprise a fluoro-silicone oil with migrating properties and includes sufficient fatty acid ester to assure satisfactory durability, yet to function as a plasticizer and also to migrate.

4. The method as recited in claim 3 wherein the pigment comprises a $CrO_2$ magnetic recording pigment; where the ester is derived from a mono-basic aliphatic acid of 12–20 carbon atoms and a mono-valent alcohol having 3–12 carbon atoms.

5. The method as recited in claim 4 wherein the structure of the fatty acid ester (FAE) satisfies the formula:

FAE: RCOOR' where R=alkyl or alkenyl wherein R'=alkyl, alkenyl, aryl, cyclohexyl or the like.

6. The method as recited in claim 5 wherein the fatty acid ester constitutes at least one selected from the group consisting of: butyl stearate, butoxy ethyl stearate, butyl palmitate, butyl myristrate, and propyl stearate.

7. A method of providing a coating for high density magnetic records, this method including:

preparing a binder to comprise a $CrO_2$ magnetic recording pigment, and to include a lubricant system comprising a fluoro-silicone oil capable of migrating within the binder and a fatty acid ester combined therewith, this oil having a viscosity, concentration, and molecular weight selected to enhance migration of the oil to the coating surface; wherein the fluoro-silicone oil is apportioned to constitute from three-tenths up to about 10 wt.% of the coating solids; and dispersing one or more abrasive pigment constituents in the binder.

8. A method of providing a coating for magnetic records, this method including:

preparing a binder to comprise a $CrO_2$ magnetic recording pigment and to include a lubricant system comprising a fluoro-silicone oil with migrating properties and a fatty acid ester combined therewith, this oil being selected to be capable of migration within the binder bulk to the coating surface; wherein the fluoro-silicone oil is apportioned to constitute at least three-tenths wt.% of the coating solids; and dispersing one or more abrasive pigment constituents in the binder;

wherein the ester is derived from a mono-basic aliphatic acid of 12-20 carbon atoms and a mono-valent alcohol having 3-12 carbon atoms, the structure of the fatty acid ester (FAE) being made to satisfy the formula:

FAE:RCOOR' where R=alkyl or alkenyl where R'=alkyl, alkenyl, aryl, and cyclohexyl; and constituting at least one selected from the group consisting of: butyl stearate, butoxy ethyl stearate, butyl palmitate, butyl myristrate, and propyl stearate;

with the ratio of fatty acid ester to fluoro-silicone oil being set to be from about 3/1 to about 12/1.

9. The method as recited in claim 8 wherein the ester comprises about 1-7 wt.% of coating solids.

10. The method as recited in claim 8 wherein the ester comprises about 1-7 wt.% butoxy ethyl stearate or butyl stearate.

11. A method of providing a coating for magnetic records, this method including:

preparing a binder to comprise a $CrO_2$ magnetic recording pigment, and to include a lubricant system comprising a fluoro-silicone oil capable of migrating within the binder and a fatty acid ester combined therewith; wherein the fluoro-silicone oil is apportioned to constitute at least three-tenths wt.% of the coating solids; and dispersing one or more abrasive pigment constituents in the binder;

wherein the ester is derived from a mono-basic aliphatic acid of 12-20 carbon atoms and a mono-valent alcohol having 3—12 carbon atoms, the lubricant oil being arranged and apportioned to constitute from three-tenths up to 10 wt.% of coating solids;

the structure of the fatty acid ester (FAE) being made to satisfy the formula:

FAE: RCOOR' where R=alkyl or alkenyl where R'=alkyl, alkenyl, aryl, and cyclohexyl.

12. In methods for preparing a magnetic recording composition including pigment dispersed in a binder, the steps of:

selecting and arranging this binder to include a migratory lubricant system incorporated therein, said lubricant system being selected and arranged to include fluoro-silicone oil material and fatty acid ester material, such that these materials having a viscosity concentration, and molecular weight selected to enhance migration of the lubricant;

wherein said fluoro-silicone oil material is selected to be capable of migration to the coating surface during extended service, as well as to be at least three-tenths wt.% of dry coating solids up to about 10 wt.% and wherein said ester is derived from a mono-basic aliphatic acid of 12-20 carbon atoms and a mono-valent alcohol having 3-12 carbon atoms.

13. The methods as recited in claim 12 as adapted for high-density high-performance computer tape wherein the structure of the fatty acid ester (FAE) satisfies the formula:

FAE: RCOOR' where R=alkyl or alkenyl where R'=alkyl, alkenyl, aryl, or cyclohexyl.

14. The methods as recited in claim 13, wherein the fatty acid ester is selected and arranged to constitute at least one selected from the group consisting of: butyl stearate, butoxyl ethyl stearate, butyl palmitate, butyl myristate, propyl stearate and the like and comprises about 1-7 wt.% of coating solids.

* * * * *